(12) United States Patent
Shah

(10) Patent No.: US 6,897,573 B1
(45) Date of Patent: May 24, 2005

(54) ELECTRICAL VOLTAGE GENERATING DEVICE

(76) Inventor: Reza H. Shah, 5730 Coopers Avenue, Unit 29, Mississauga, Ontario (CA), L4Z 2E9

( * ) Notice: Subject to any disclaimer, the term of this patent is extended or adjusted under 35 U.S.C. 154(b) by 0 days.

(21) Appl. No.: 10/847,028

(22) Filed: May 17, 2004

(51) Int. Cl.[7] .............................. F04B 35/00; H02P 9/00; H02P 9/04

(52) U.S. Cl. ...................... 290/1 A; 290/1 C; 290/1 D; 290/42; 290/43; 290/52; 290/53; 310/12; 310/15; 310/17; 322/35

(58) Field of Search ................................. 290/1 R, 1 A, 290/1 C, 1 D, 42, 43, 52, 53; 310/12, 15, 17; 322/35

(56) References Cited

U.S. PATENT DOCUMENTS

| | | | | |
|---|---|---|---|---|
| 3,766,399 A | * | 10/1973 | Demetrescu | 290/40 R |
| 4,739,179 A | * | 4/1988 | Stites | 290/1 R |
| 5,296,799 A | * | 3/1994 | Davis | 322/35 |
| 5,347,186 A | * | 9/1994 | Konotchick | 310/17 |
| 5,554,922 A | * | 9/1996 | Kunkel | 322/3 |
| 5,631,507 A | * | 5/1997 | Bajric | 310/67 |
| 5,975,714 A | * | 11/1999 | Vrterino | 362/192 |

\* cited by examiner

*Primary Examiner*—Darren Schuberg
*Assistant Examiner*—Iraj A. Mohandesi
(74) *Attorney, Agent, or Firm*—David W. Wong

(57) ABSTRACT

A manually operated voltage generating device provides an electrical voltage for operating an electronic unit such as a remote control handheld unit. The device has a permanent magnet mounted in a horizontal manner at the underside of a mild steel plate. The magnet is normally located in a spaced manner from the central post of an E-shaped core. A winding is wound on the central post. A compression spring mounted over the core maintains the magnet normally spaced above the core. The mild steel plate is operative in an up and down manner against the spring force of the spring to move the magnet in a reciprocating movement relative to the core so as to generate a current in the winding. The current charges a capacitor, and the voltage across the capacitor provide the electrical voltage for operating the electronic unit.

13 Claims, 3 Drawing Sheets

ELECTRICAL VOLTAGE GENERATING DEVICE

FIELD OF THE INVENTION

This invention relates to a device for generating an electrical voltage, and more particularly relates to a device manually operative for providing an electrical voltage supply for operating a small electrical appliance such as a handheld electronic unit which only requires a low electrical voltage to operate in short durations.

Handheld battery operated electronic units such as remote control units are widely used in electrical appliances such as television, audio and video equipment, and similar remote-controlled electronic and electrical appliances. Such handheld electronic units are only required to operate occasionally and for only a short instance. Nonetheless, the power of all the batteries of handheld electronic units will become depleted sooner or later with the repeated intermittent use of the batteries and they must be replaced from time to time. As electronic units use a variety of different types and sizes of batteries, it has been very frustrating for the users to obtain the correct types and sizes of batteries for replacement. Furthermore, most batteries contain materials that are harmful to the natural environment or would cause an explosion if they are negligently disposed of in a hot atmosphere. Thus, batteries must be disposed with special care and precaution rather than just be thrown out with the common garbage in order to prevent their harmful pollution of the natural environment or an accidental explosion. Therefore, it is highly desirable to eliminate the use of batteries in electrical and electronic units.

SUMMARY OF THE INVENTION

It is a principal object of the present invention to provide a device which may be incorporated in a handheld electronic unit and is operative to generate the electrical voltage required for operating such unit.

It is another object of the present invention to provide a device which can be easily attached to or integrally incorporated in an intermittently operating electronic unit to provide electrical power for operating such unit.

It is another object of the present invention to provide a device which is simple in construction and is easy to operate.

Briefly, the device of the present invention comprises a circular pot-shaped ferrous core mounted on a non-ferrous support plate. The core has a central post surrounded by a well, and the central post has a horizontal upper surface. An electromagnetic winding is located in the well and is wound around the central post of the core. A cylindrical spring is mounted over the core. The spring has an upper end located a short distance above the upper surface of the central post of the core. A movable plate is mounted in a horizontal manner on the upper end of the spring. A permanent magnet is mounted at the underside of the movable plate. The movable plate is operative to move up and down against the spring force of the spring to move the permanent magnet in a reciprocating movement between an upper position at which the permanent magnet is positioned spaced from the upper surface of the central post of the core, and a lower position at which the permanent magnet is in contact with the upper surface of the central post of the core. A current is generated in the electromagnetic winding by the reciprocating movement of the permanent magnet relative the core.

BRIEF DESCRIPTION OF THE DRAWINGS

In the accompanying drawings.

DETAILED DESCRIPTION OF THE PREFERRED EMBODIMENTS

Figure 1:
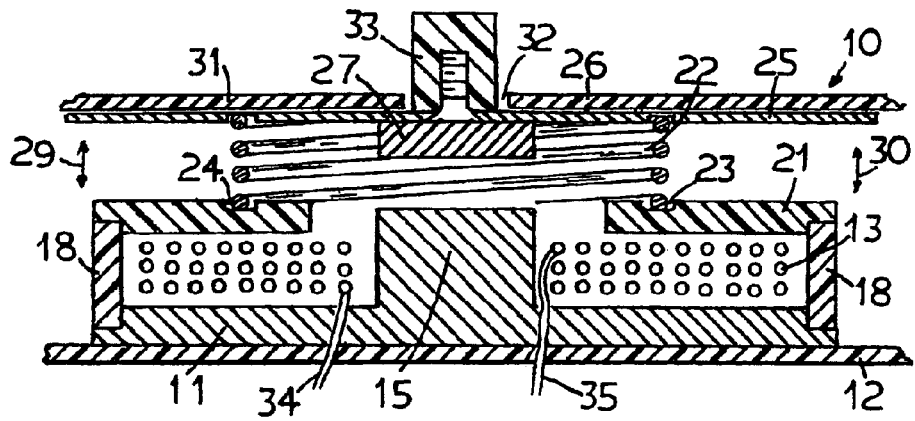
FIG. 1 is a partially sectional side elevation view of the power generating device according to the present invention.
Figure 2:
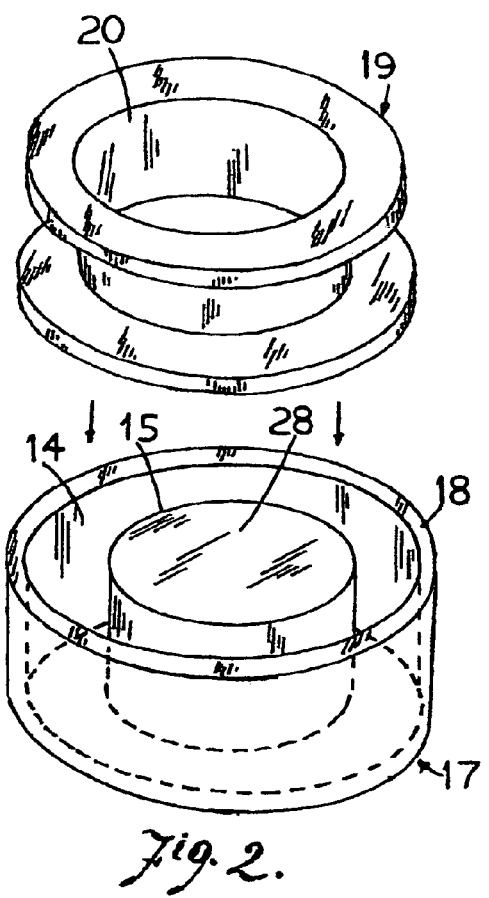
FIG. 2 is a perspective elevation view of a circular pot type ferrous core and a circular bobbin for providing an electromagnet winding around the central post of the core.
Figure 3:
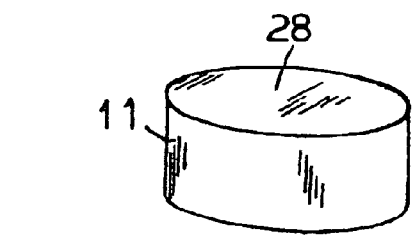
FIG. 3 is a perspective elevation view of an alternative circular ferrous core.
Figure 4:
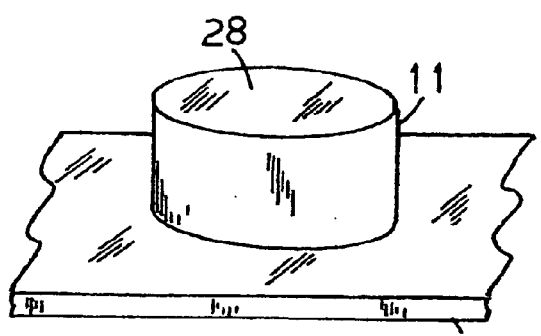
FIG. 4 is a perspective elevation view of the alternative circular ferrous core provided with a supporting base plate.

With reference to the drawings, the voltage generating device 10 of the present invention has a ferrous core 11, made of a ferrous material such as mild steel, mounted on a plastic or non-ferrous support plate 12 or directly in the base panel of the plastic enclosure of a remote control unit. A winding of electromagnetic wire 13 is provided in a circular well 14 surrounding the central rectangular post 15 of the core 11. An annular support plate 16 is mounted over the As shown in FIG. 2, the ferrous core 11 is in the form of a circular pot 17 having the circular well 14 surrounding the central circular post 15. The cylindrical side wall 18 of the circular pot 17 may be either integrally formed with the pot or a separate cylindrical tubing disposable over the base of the pot 17. The electromagnetic winding 13 may be provided on a circular bobbin 19 having a central opening 20. The diameter of the bobbin 19 is complementary to that of the circular well 14 and the bobbin 19 carrying the electromagnetic winding 13 may be placed within circular well 14 so that the electromagnetic winding 13 surrounds the central post 15 of the core 11. An annular plate 21 is mounted over the top of the circular pot 17. A compression spring 22 which may be in the form of a spiral compression spring as shown in FIG. 1 is mounted over the annular plate 21. An annular groove 23 is formed on the top surface of the annular plate 21 and is adapted to engage with the lower end 24 of the spring 22 for maintaining the spring 22 in position. A mild steel plate 25 is mounted in a horizontal manner on the upper end 26 of the spiral spring 22. A permanent magnet 27 is mounted at the underside of the mild steel plate 25. The permanent magnet 27 has a size and shape similar to the upper surface 28 of the central post 15 of the core 11 and it is normally maintained in a spaced manner above the upper surface 28 of the central post 15 of the core 11 by the spiral spring 16. The mild steel plate 25 is movable in a reciprocating up and down movement, shown by the arrows 29 and 30, by first depressing the mild steel plate 25 downward against the spring force of the spiral spring 22 and then releasing the depressing force. When the depressing force is released, the spring force of the spiral spring 22 will return the mild steel plate 25 to its normal upper position. Therefore, the mild steel plate 25 may be operated in an up and down manner to operate the permanent magnet 27 in a reciprocating movement such that the permanent magnet 27 is located in the lower position at which it will contact the upper surface 28 of the central post 15 of the core 11 and in the normal upper position at which the permanent magnet 27 is spaced from the upper surface 28 of the core 11. The mild steel plate 25 may additionally be retained at its upper position by a retainer 31 which may be the upper enclosure panel of the electronic unit with an opening 32 formed therein. A push button 33 is mounted on the mild steel plate 25 to facilitate the up and down operation of the latter.

Figure 12:
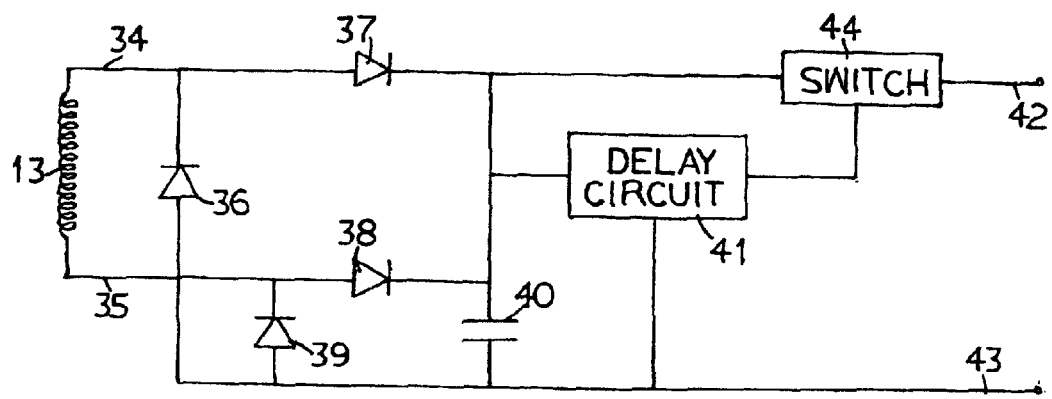
FIG. 12 is a schematic circuit diagram of the electrical circuit for providing electrical voltage to an electronic unit with the device of the present invention.

The reciprocating movement of the permanent magnet 27 relative to the core 11 generates an electrical current in the electromagnetic winding 13. As shown in FIG. 12, the electrical current is outputted by lead wires 34 and 35 of the winding 13 to flow through a full wave bridge circuit consisting of diodes 36, 37, 38 and 39 to charge a capacitor 40. The voltage generated across the capacitor 40 is controlled by a delay circuit 41 in order to ensure that a sufficient magnitude of voltage is provided through output terminals 42 and 43 for operating the electronic unit. A switch 44 is also provided to control the supply of the voltage to the electronic unit.

Figure 13:
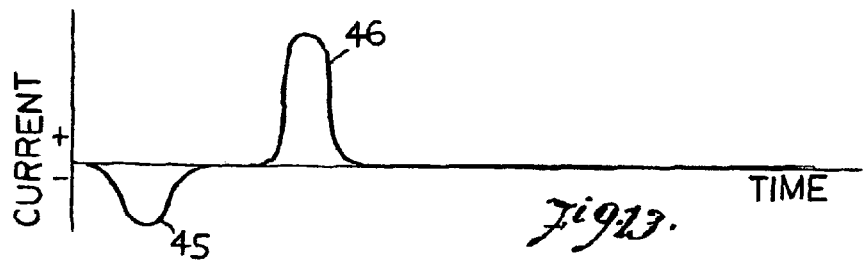
FIG. 13 is a diagram showing the current generated in the electromagnetic winding during the operation of the device of the present invention.
Figure 14:
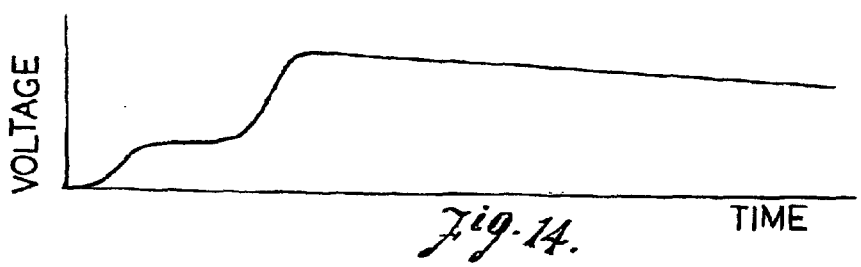
FIG. 14 is a diagram showing the voltage across the capacitor during the operation of the device of the present invention.

The diagram as illustrated in FIG. 13 shows the current generated in the electromagnetic winding 13 in the reciprocating movement of the magnet 27. When the magnet 27 first contacts the core 15, a negative pulse 45 is generated, and when the magnet 27 is released to travel back to its upper position, a positive pulse 46 is generated. The negative and positive pulses 45 and 46 are converted by the full wave rectifier bridge circuit for charging the capacitor 40. The delay circuit 41 provides the time delay for both of these pulses to be converted for providing the total current generated for charging the capacitor. The charging operation of the capacitor 40 in one cycle of the reciprocating movement is shown in the diagram illustrated in FIG. 14.

Figure 5:
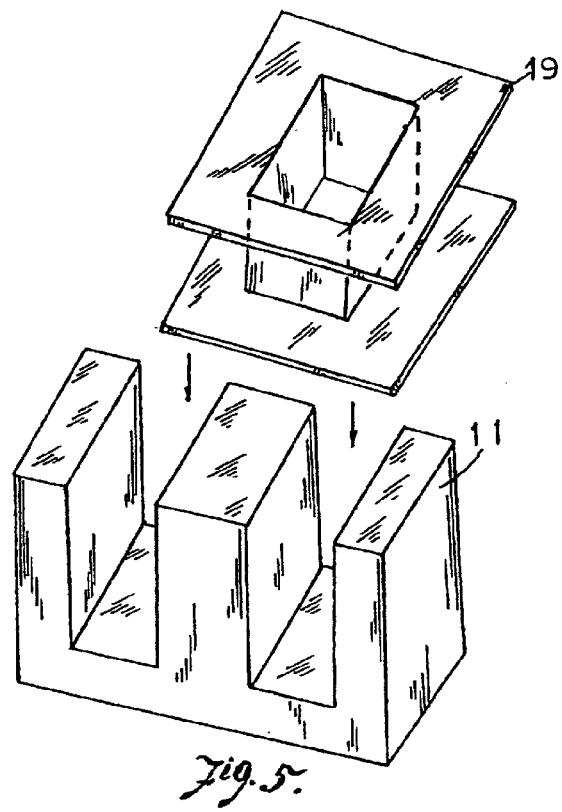
FIG. 5 is a perspective elevation view of an alternative E-shaped ferrous core and a rectangular bobbin for providing electromagnetic winding around the central post of the core.
Figure 6:
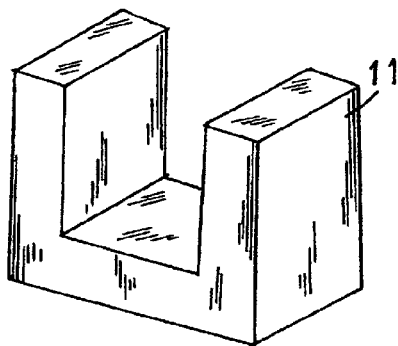
FIG. 6 is a perspective elevation view of an alternative C-shaped ferrous core.
Figure 7:
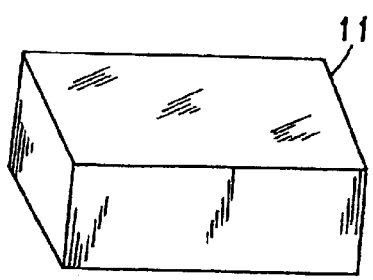
FIG. 7 is a perspective elevation view of an alternative rectangular ferrous core.
Figure 8:
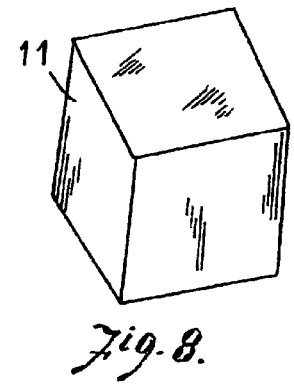
FIG. 8 is a perspective elevation view of an alternative square cubic ferrous core.

The ferrous core 11 may alternatively be E-shaped as shown in FIG. 5 and the electromagnetic winding 13 may be provided with a rectangular bobbin mounted over the central post of the E-shaped core. A C-shaped core may be provided as shown in FIG. 6. In this embodiment, the rectangular bobbin may be mounted over one of the arms of the C-shaped core. Alternatively, the core 11 may have a simple rectangular shape as shown in FIG. 7, or a cubic shaped as shown in FIG. 8. The electromagnetic winding 13 may be directly wound on the rectangular or cubic core or provided by a bobbin.

Figure 9:
FIG. 9 is a perspective elevation view of a circular magnet for use with the circular core of the present invention.
Figure 10:
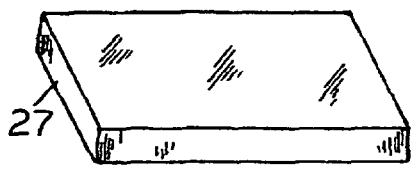
FIG. 10 is a perspective elevation view of a rectangular magnet for use with the E-shaped, C-shaped, and rectangular cores.
Figure 11:
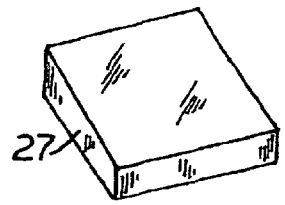
FIG. 11 is a perspective elevation view of a square magnet for use with the cubic core.

The magnet 27 has a horizontal shape and dimension similar to that of the upper surface 15 of the vertical post of the core to provide a high efficiency voltage generation. A circular magnet 27 as shown in FIG. 9 may be used with the pot shaped core. A rectangular magnet as shown in FIG. 10 may be used with the rectangular core, and a square magnet as shown in FIG. 11 may be used with the cubic core.

The device of the present invention is particularly effective for providing the electrical voltage for operating electronic unit such as a handheld remote control unit for television and the like in which the electronic unit only requires electrical power for short durations. The device may be easily incorporated integrally in any handheld electronic unit or attached to such electronic unit.

While a principle of the present invention has been described above in connection to preferred embodiments of the invention, it is intended that all matter contained in the above description and drawings shall be interpreted as illustrative rather than in a limiting sense.

What I claim is:

1. A voltage generating device comprising,
an ferrous core mounted on a non-ferrous support plate, said core having a vertical post and said vertical post having a horizontal upper surface,
an electromagnetic winding wound around said vertical post,
a compression spring mounted over said core, said spring having an upper end located in a spaced manner above said upper surface of said vertical post,
a movable plate mounted in a horizontal manner on said upper end of said spring,
a permanent magnet mounted at underside of said movable plate and located directly above said upper surface of said vertical post, said movable plate being operative in an up and down manner against the spring force of said spring to operate said permanent magnet in a reciprocating movement between an upper position wherein said permanent magnet is positioned spaced from said upper surface of said vertical post, and a lower position wherein said permanent magnet is in contact with said upper surface of said vertical post whereby a current is generated in said electromagnetic winding by said reciprocating movement of said magnet relative to said core.

2. A voltage generating device according to claim 1 including a support plate mounted on top of said core to support said spring and retainer plate located above said movable plate and adapted to retain said movable plate at said upper position.

3. A voltage generating device according to claim 2 wherein said core is a circular pot shaped core made of mild steel having a circular well surrounding central vertical post, and said electromagnetic winding is provided on a circular bobbin located within said circular well for mounting over said central vertical post of said core whereby said electromagnetic winding surrounds said central vertical post.

4. A voltage generating device according to claim 3 wherein said ferrous core is an E-shaped core mounted in a horizontal position on said support plate, and said E-shaped core having a central vertical post adapted to receive a rectangular bobbin carrying said electromagnetic winding to be mounted thereto.

5. A voltage generating device according to claim 3 wherein said ferrous core is a generally C-shaped core mounted in a horizontal position on said support plate, and said rectangular bobbin carrying said electromagnetic winding is mounted on one vertical arm of said C-shaped core.

6. A voltage generating device comprising,
a circular pot-shaped mild steel core mounted on a support plate, said core having a vertical cylindrical central post surrounded by a circular well, and said central post having a horizontal upper surface, electromagnetic winding wound on a circular bobbin mounted in said well whereby said electromagnetic winding surrounds said central post of said core, an annular plate mounted over said core, a compression spiral spring mounted on said annular plate, said spring having an upper end located spaced above said upper end of said central post of said core, a mild steel movable plate mounted in a horizontal position on said upper end of said spring, a circular permanent magnet mounted at an underside of said movable plate and located directly opposite to said upper surface of said central post of said core, said movable plate being operative in an up and down manner against the spring force of said spring to operate said permanent magnet in a reciprocating movement between an upper position wherein said permanent magnet is spaced from said upper surface of said central post and a lower position wherein said permanent magnet is in contact with said upper surface of said central post whereby a current is generating in said winding by said reciprocating movement of said permanent magnet relative said core.

7. A voltage generating device according to claim 6 including a circular groove formed on said annular plate and adapted to engage with a lower end of said spring for maintaining said spring securely mounted to said annular plate.

8. A voltage generating device according to claim 7 including a push button mounted on said movable plate and operative for facilitating said reciprocating movement of said movable plate.

9. A voltage generating device according to claim 8 including a capacitor connected to lead wires of said electromagnetic winding and adapted to be charged by said current generated in said winding for providing an operating voltage to an electronic unit.

10. A voltage generating device according to claim 9 including a rectifier circuit connected between said capacitor and said electromagnetic winding for converting said current to a direct current for charging said capacitor.

11. A voltage generating device according to claim 10 including a delay circuit adapted to provide a predetermined time period for total current generated in one cycle of said reciprocal movement of said magnet for charging said capacitor prior to passing voltage across said capacitor to be supplied to said electronic unit.

12. A voltage generating device according to claim 11 including a switch adapted to control the supply of said voltage to said electronic unit.

13. A voltage generating device according to claim 12 wherein said permanent magnet has a horizontal shape and dimension similar to said upper surface of said central post of said core.

* * * * *